United States Patent [19]

Dixon

[11] Patent Number: 4,815,855

[45] Date of Patent: Mar. 28, 1989

[54] INTERFEROMETRIC LOAD SENSOR AND STRAIN GAGE

[75] Inventor: William P. Dixon, Tullahoma, Tenn.

[73] Assignee: The United States of America as represented by the Secretary of the Air Force, Washington, D.C.

[21] Appl. No.: 882,059

[22] Filed: Jul. 3, 1986

[51] Int. Cl.$^4$ ................................................. G01B 9/02
[52] U.S. Cl. ..................................... 356/358; 356/352; 356/35.5
[58] Field of Search ..................... 356/352, 358, 35.5

[56] References Cited

U.S. PATENT DOCUMENTS

| | | | |
|---|---|---|---|
| 2,312,888 | 3/1943 | Everest | 356/35.5 |
| 3,635,562 | 1/1972 | Catherin | 356/358 |
| 4,286,879 | 9/1981 | Jager et al. | 356/358 |
| 4,436,419 | 3/1984 | Stetson et al. | 356/35.5 |
| 4,526,465 | 7/1985 | Corti et al. | 356/35.5 |
| 4,533,247 | 8/1985 | Epworth | 356/352 |

Primary Examiner—Vincent P. McGraw
Assistant Examiner—S. A. Turner
Attorney, Agent, or Firm—Donald J. Singer; Jacob N. Erlich; Jules J. Morris

[57] ABSTRACT

The invention comprises an interferometric load sensor, or force balance 10 which utilizes etalons 12, 14 to form a reflective cavity 16. A fringe pattern is formed in cavity 16 by light from laser source 26. One of the etalons (14) is mounted to a section 20 that is sensitive to the application of a force 22. Flexing of cantilever 24 due to application of force 22 on section 20 changes the air gap wedge angle between the etalons 12, 14 and thereby shifts the fringe field formed in cavity 16. The shift in the fringe field is observed by light detectors 30, 32.

1 Claim, 13 Drawing Sheets

INTERFEROMETRIC LOAD SENSOR AND STRAIN GAGE

STATEMENT OF GOVERNMENT INTEREST

The invention described herein may be manufactured and used by or for the Government for governmental purposes without the payment of any royalty thereon.

TECHNICAL FIELD

This invention relates to devices for detecting very small changes in mechanical loading and is particularly related to a means and apparatus for constructing very stiff force balances and strain gages.

BACKGROUND OF THE INVENTION

One method of measuring an unknown force comprises applying the force to some elastic member and measuring the resultant deflection or strain. Conventional strain gages are used to measure the effects of unknown forces on devices and structures. Strain gages can be used either to determine the strain caused to a device by loads during its operation or they can be used to determine an unknown force in a wind tunnel by measuring how the force affects a force balance fixture. Similar force balance fixtures are used in other applications.

A common problem with force balances is that they are subject to overload grounding and damage as well as some other limitations. Under some conditions momentary high loads cause fixture grounding which damages the strain gages and disrupts force balance calibration.

It is an object of the present invention, therefore, to Provide a force balance that is substantially uneffected by momentary overloads and groundings.

Conventional wire strain gages have been very effective in measuring strains in most applications. Conventional strain gages are of limited use, however, when they are applied to very stiff structures. The normal sensitivity range of conventional strain gages is from about $2 \times 10^{-3}$ to $10^{-6}$ inches per inch. The upper limit of $2 \times 10^{-3}$ inches per inch, approaches the elastic limit for high strength steel used in force balance fixtures. At the lower limit, strain gage bridge output drops into the region where the output is made unreliable due to Seebeck potentials and zero drifts related to imperfect matching of resistance, gage factors and temperature effects. This limits strain gage utility for very stiff structures and for measuring very small forces. Small forces which, for example, may be almost insignificant in wind tunnel testing can be very significant in flight. A need therefore exists for very sensitive force detection beyond that which is currently possible with conventional strain gages.

Large non-elastic structures such as concrete buildings are sometimes unable to bear very much strain prior to failure. Minute amounts of strain may therefore be significant in determining the use and predicted life expectancy of non-eleastic structures. A need therefore exists for a means of measuring very small amounts of strain.

In view of the above it is an object of this invention to provide a means particularly suitable for measuring very small forces and minute amounts of strain.

It is a further object of this invention to provide a means for determining strain in very stiff structures.

SUMMARY OF THE INVENTION

The invention comprises a load sensor, or force balance, which utilizes an interferometer in place of conventional wire strain gages. A first etalon plate is positioned on a rigid fixture while the second etalon plate is positioned on a load sensitive fixture that is subject to flexure. The plates each have partially reflecting surfaces that are positioned opposite each other. It is preferred that the adjacent partially reflective surfaces of the two etalon plates are parallel within a few seconds.

In a preferred embodiment of the load sensor, the air wedge gap angle between the two etalon plates is less than 5 seconds. When a monochromatic collimated light source is transmitted through the etalons, light fringes are produced between the two plates. The light fringes are very sensitive to the wedge angle but rather insensitive to the beam angle. Therefore, flexing of the load sensitive fixture moves the second etalon plate and results in a fringe shift. Detector means are provided for detecting shifts in the light fringes between the etalons.

In a preferred usage of the invention the interferometric load sensor forms a part of a force balance suitable for use in a wind tunnel.

In the preferred embodiment of the invention the fringe field comprises one dark and one light fringe. A first detecting means is used to detect changes in this fringe field image as it is transmitted through the etalon plates. A second detecting means is used to view this fringe field image as it is reflected from one of the etalon plates. One of the detecting means views the dark portion of the fringe field while the other views the light portion. This results in the detectors sensing opposite intensity slopes during a fringe shift so that combining the signal of the two detectors increases the sensitivity of the output. Alternatively, the two detectors can be used in a redundant fashion.

The light source can take a number of forms in the embodiments but a colliminated beam is required, preferably a laser beam. The laser light can be generated from a conventional laser and transmitted through a fiber optic filament or alternatively a laser diode can be used to generate the beam.

In yet another preferred embodiment of the load sensor two right angle prisms are used as the optical components in the load sensing device. One of the prisms is attached to a rigid support while the other prism is attached to a support subject to flexing due to load. The faces of the prisms that are most adjacent are partially reflective so that a fringe field will be formed between the prisms. The detector means and light source are similar to those of the above embodiments.

In another preferred embodiment, the invention comprises an interferometric strain gage in which parallel and adjacent etalon plates are positioned on a structural member subject to strain. Each of the etalons has a non-reflective and a partially reflective surface. A light source is used to project a collimated beam of monochromatic light into a cavity formed between the adjacent etalons. Detector means detect changes in a light pattern formed in the cavity between the adjacent etalon. The changes of the light pattern can be related to strain of the structural member to which the etalons are attached. In the preferred embodiment of the strain gage, the etalon plates are placed on opposite sides of the point of maximum deflection of the structural member due to strain.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Interferometry is a well known technique for measuring very small distances. With the advent of inexpensive laser light producing devices interferometry has found wider applications than ever before since it is relatively easy to produce light fringes from coherent monochromatic light. A particular interferometric technique that has proven quite useful is known as the fizeau interferometer. The basic fizeau interferometer utilizes two parallel and adjacent partially reflective surfaces to form an internally reflective cavity. When the air gap angle between the adjacent partially reflective optical surfaces is made quite small light fringes are formed therebetween. These fringes are often used to judge the conformance of adjacent optical surfaces and for measurement of optical beam collimation. In this invention the fizeau interferometer is used to measure very small angular changes in the orientation of the optical components and has been particularly utilized to detect minute changes in the orientation of two optical surfaces mounted on a test fixture.

The fizeau interferometer can be used to measure strain in very stiff wind tunnel balances when associated with the force balance fixtures of this invention. Other uses have also been developed and include xeasurement of small amounts of strain on structures and test objects. Both of these uses are made practicable by the development of optics that can be incorporated within a confined space.

Figure 1:
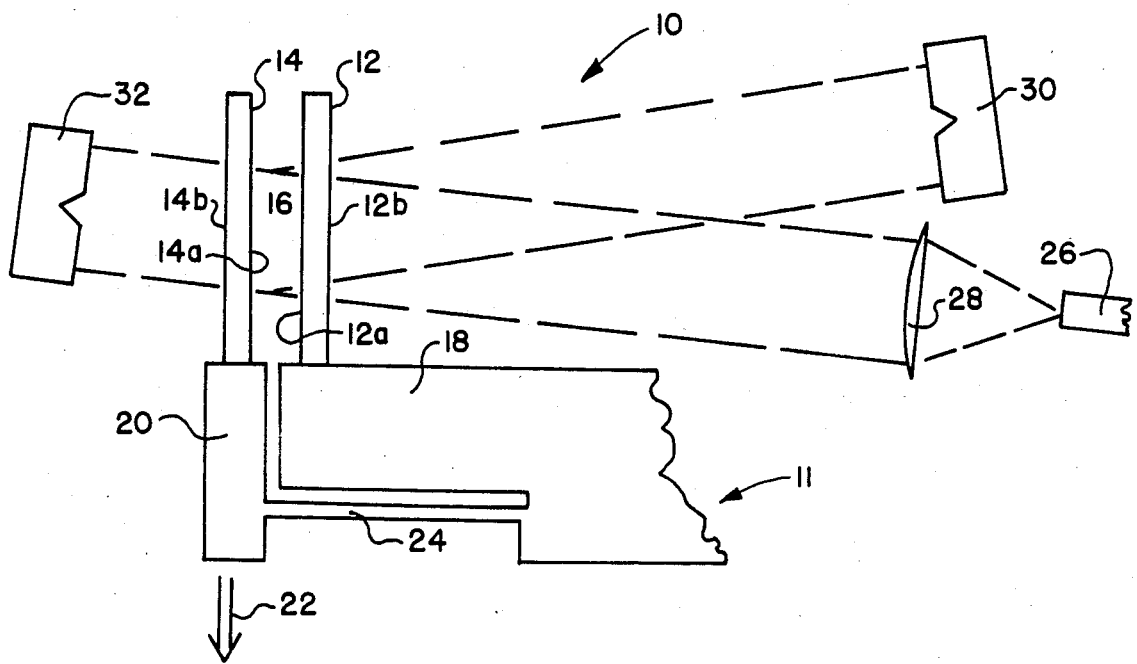
FIG. 1 is a schematic representation of a force balance embodying the of this invention.

The schematic representation of FIG. 1 shows a force balance 10 which includes fizeau interferometer mounted onto a load sensing fixture 11. The load sensing fixture 11 is particularly susceptible to downward force 22. The interferometer sensing device is made from two etalon plates 12, 14 having surfaces 12a, 12b and 14a, 14b which are parallel within a few seconds and flat to within a tenth of a wavelength where the wavelength of light is considered to be about 550 nm. Surfaces 12a and 14a are preferably about 50 percent reflective and form a reflective cavity 16. Surfaces 12b and 14b are non-reflective and are coated with an anti-reflective coating.

Etalon 12 is mounted to a rigid portion 18 of the fixture 11 whereas etalon 14 is mounted to a portion of the fixture, section 20, that is subject to flexing from a force 22 (shown by arrow). Section 20 is connected to the rigid portion 18 by a cantilever portion 24 that has been thinned to allow flexing.

Monochromatic light from a point source 26 is very well collimated by a lens 28 and passes through the interferometer at an angle of less than 20° Surfaces 12a and 14a are initially set to be parallel within a few seconds. A light fringe field is then formed in air gap, or cavity 16 which consists of one dark and one light band. An adjustment can be used to rotate the etalons relative to the light beam source 26, 28 in order to shift the fringe field to the preferred half light, half dark configuration. The fringe field can be viewed from anywhere in the beam when a screen is provided.

The air gap wedge angle between the etalon plates is equal to the wavelength of light divided by twice the distance between the successive light fringes in the field. When the air gap wedge angle is less than 5 seconds, the position of the fringes within the field becomes very sensitive to the wedge angle but somewhat insensitive to the light beam angle. This is important so that minor relative movement between the force balance and the light source can be discounted.

This invention relies on detecting a fringe shift in cavity 16. For large amount of strain in the range of $10^{-6}$ to $10^{-3}$ inches per inch a number of fringe lines cross the fringe field and complex fringe counting techniques are required to measure strain. This puts an interferometric strain gage/force balance at somewhat of a disadvantage in comparison with conventional strain gages in terms of ease of use. This invention is primarily useful for measuring small amounts of strain on stiff balances where the range of strain is $10^{-8}$ to $10^{-5}$ inches per inch. At this range of strain the fringe field merely shifts position instead of resulting in a number of fringe lines crossing the field.

This embodiment relies on detectors 30 and 32 which are focused on the fringe field in cavity 16. Detector 32 views the transmitted fringe field while detector 30 views the reflected fringe field. Because the reflected field is dark where the transmitted one is light, the intensity slopes of the outputs of the detectors are opposite. This allows the operator to electronically ratio the outputs in order to produce a larger shift in signal and higher sensitivity during fringe shifts. The combined voltage signal therefore changes rapidly and results in a very sensitive load detector. In other operations use of two detectors provide a needed amount of redundancy to guard against loss of signal. Further, convenience or orientation of the load sensing device may dictate use of only one of the two detectors.

Typically the detector signal is monitored prior to and during the application of a load, or force, 22. When the fixture 11 is subject to load, flexing of the cantilever 24 will produce movement of etalon 14 and a variation in the wedge angle. This variation in wedge angle immediately produces a change in signal at detectors 30 and 32 by shifting the fringe field formed between the etalon plates in cavity 16.

The signal produced by the detectors 30, 32 is no more difficult to process than a conventional strain gage signal. The same quality signal processing required to resolve three decades of conventional strain gage output is all that is required to process three decades of optic data when the optic data is supplied from a similar output; namely, a single value voltage as a function of fringe position within the detector field of view. Therefore, the optic readout of the interferometric force balance fills a specific need, it makes possible the development of very stiff force balances that are easy to use and that do not ground out when subject to large pitching moments.

Grounding can be defined as a full flexing of the test fixture until it hits its stops. Conventional strain gages are often thrown off calibration by any such momentary movement of the fixture. This results in tedious and lengthy recalibration that can hold up test or machine operation. When optic strain gage are subject to large pitching moments there may be a succession of fringes across the optic field. These movements are not destructive to use of the force balance 10 if it returns to its static position. Assuming that the flexure fixture is still elastic the optic strain gage would not require extensive recalibration.

Figure 2:
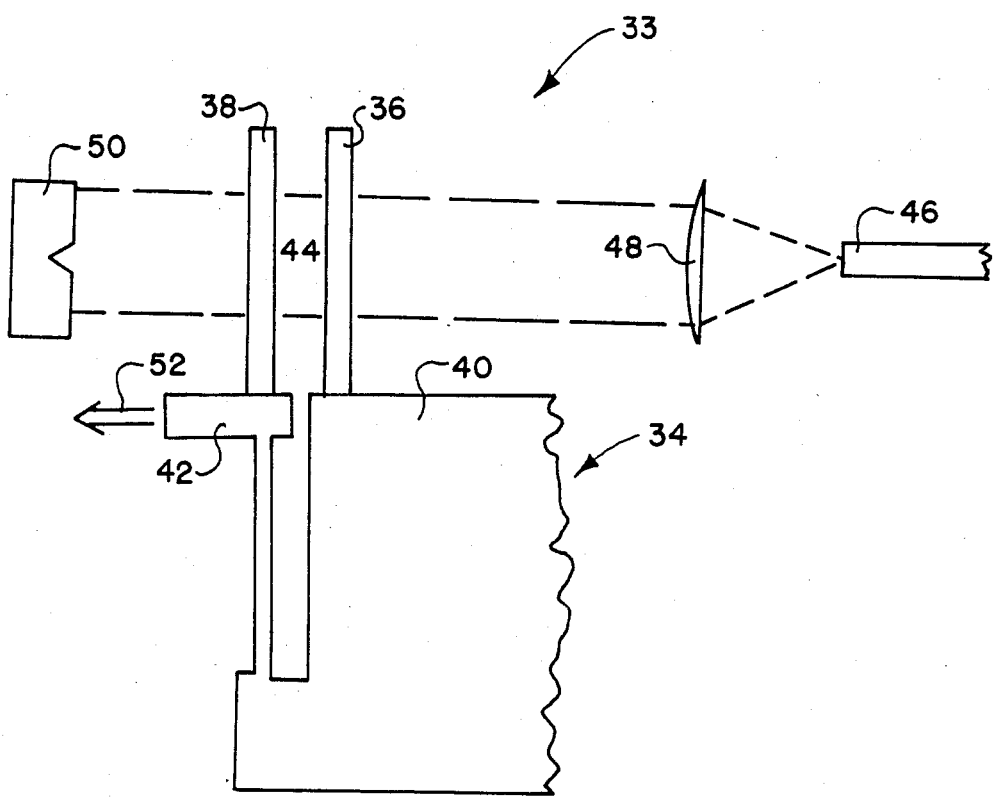
FIG. 2 is second embodiment of a force balance incorporating the principles of this invention.

FIG. 2 discloses a second embodiment of an interferometric force balance 33. In this embodiment two etalons 36, 38 are attached respectively to a fixed portion 40 and a flexing portion 42 of a load sensing fixture 34. The force balance 34 is particularly sensitive to a side force as noted by arrow 52. The etalons are similar to those discussed in reference to FIG. 1 and have partially reflecting surfaces which form an internal reflective cavity 44 therebetween. Light transmitted from a light source 46 and collimated by lens 48 will form fringes in cavity 44 when the two etalons are parallel within about one minute. When the air gap angle is very small, the field becomes insensitive to light beam angle. This fringe field is also resolved into a light and dark fringe. Detector means 50 is then used to detect changes in the fringe field in cavity 44 which result from movement of etalon 38 due to force 52.

The two force balances described above demonstrate the flexibility of this invention for measuring forces where objects have multiple degrees of freedom as is common in wind tunnel tests. Typically such measurement would normally be made by a multitude of conventional strain gages in wheatstone bridges. Several force balances as described above are used to replace the conventional strain gages and detect wind tunnel forces with much higher sensitivity.

Figure 3:
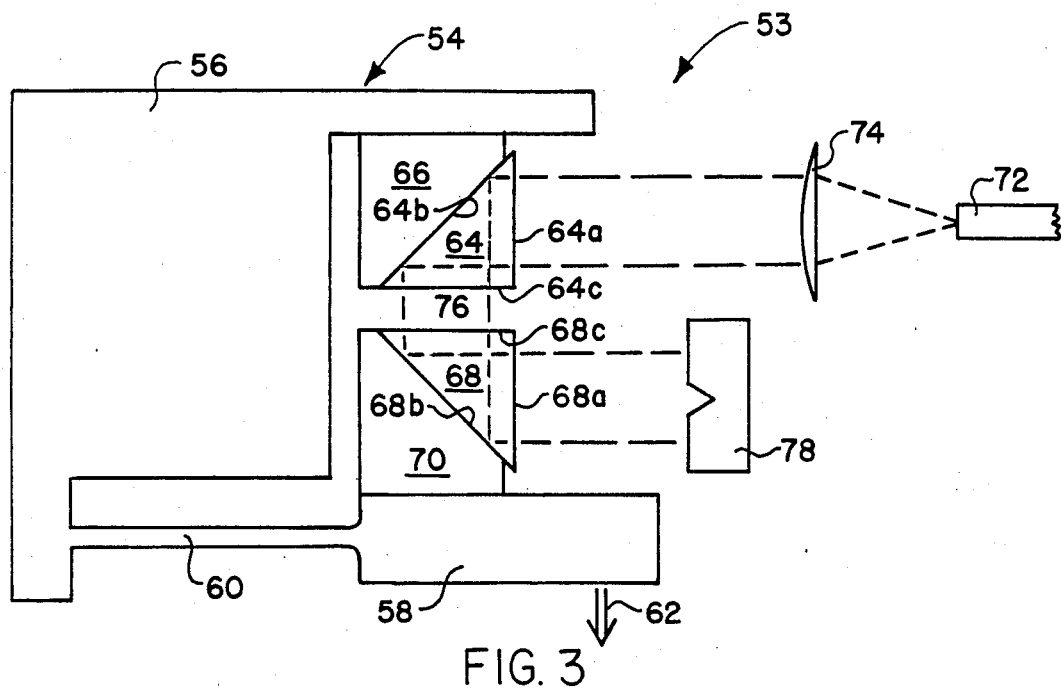
FIG. 3 is yet another embodiment of the invention which utilizes prisms to form a compact interferometric force balance.

Yet another embodiment of an interferometric force balance 53 is shown in FIG. 3. The device of FIG. 3 utilizes prisms as they make for a rugged and compact installation. The load fixture 54 comprises a rigid portion 56 and a portion subject to flexing 58. Section 58 is attached to the rigid section 56 by a cantilever beam 60. Arrow 62 represents the force to which this fixture is most sensitive.

A first prism 64 is attached to the rigid portion of fixture 54 by an adapter 66. A second identical prism 68 is attached to the load sensitive member 58 through an adapter 70. Facets 68a and 64a are coated with a anti-reflective coating similar to the outer surfaces of the etalons of the previous embodiments. Light from a light source 72 is collimated by a lens 74 and passes into prism 64 there it is reflected by a reflective internal facet 64b into cavity 76. Surfaces 64c and 68c framing cavity 76 are partially reflective, preferably about 50% reflective, a reflective cavity 76 is therefore formed between the prisms. This cavity is similar to the air gap cavities 16 and 44 of the previous embodiments. Some of the light is transmitted by the partially reflective surface, into prism 68 and reflected by internal facet 68b out to a detector 78. The detector 78 is sensitive to changes in a fringe field that forms in cavity 76 when surfaces 64c and 68c are parallel within about one minute. When the surfaces are brought closely parallel within about five seconds a dark and light fringe field can be formed as a means for detecting changes in the force load 62 upon load fixture 54.

Operation of this embodiment of the invention is identical to that discussed in reference to the previous embodiments. Detector 78 has an initial output determined by the fringe field formed in cavity 76. This fringe field shifts according to force applied to lever arm 58. Since the prism is attached through adapter 70 to the flexible portion 58 of the load fixture, changes in applied force result in a change in the fringe pattern in cavity 76. These changes are detected and transmitted as a variable voltage by detector 78. The detectors discussed in reference to this embodiment and the previous embodiments are explained in greater detail below.

While the schematic representations of the force balances and of FIGS. 1, 2 and 3 are cantilever devices, there are other applications suitable for interferometric strain gages. Interferometric strain gages are particularly useful in applications where the stiffness of the components makes them unsuitable for conventional strain gages. They can also be used to discern balance component interactions that can affect conventional strain gage accuracy. The cantilever devices of FIGS. 1, 2 and 3, however, provide a larger air gap wedge angle change and therefore an increased fringe shift signal change per unit strain in flexure than simple beams. Two embodiments of an interferometric strain gage in use with simple beams are shown in the schematics of FIGS. 4 and 5.

Figure 4:
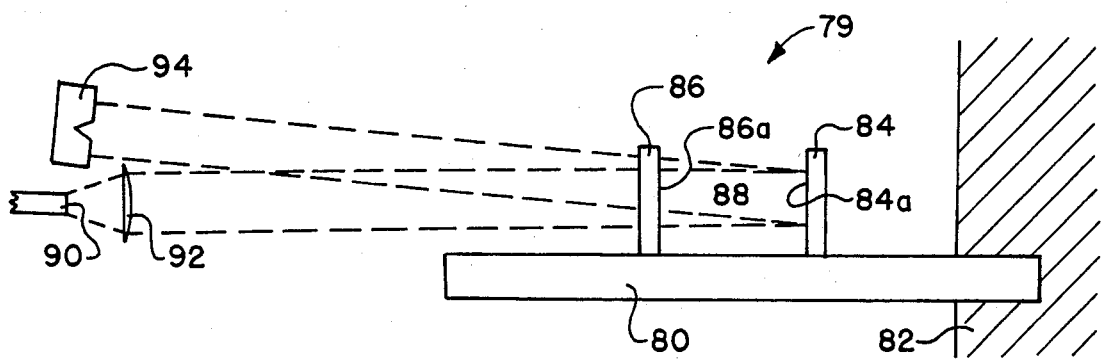
FIG. 4 is a schematic representation of a interferometric strain gage for a beam fixed at one end.

The view of FIG. 4 shows an interferometric strain gage 79 associated with a beam 80 that is fixed at one end by support 82. Mounted upon the beam 80 are two etalons 84 and 86 having partially reflective inner surfaces 84a and 86a. A reflective cavity 88 is formed which internally reflects light Projected from light source 90 and collimating lens 92. Fringes are formed in cavity 88 when the etalons are parallel within about one minute, it is preferred however, that the etalons be parallel to within about five seconds. The fringe pattern is observed by detector 94. Movement of the beam 80 shifts the air gap wedge angle and therefore the fringe pattern in cavity 88, this shaft is observed by detector 94.

In order to maximize sensitivity of this interferometric strain gage it is preferred that the optical elements 84 and 86 are supported on opposite sides of the point of maximum beam deflection curvature or moment which are not necessarily the same. This point depends upon where the force is applied to the beam 80. It is also possible to separate the optical elements by as much as two inches in order to maximize the chances that the optical elements will be supported on opposite sides of the point of deflection. In other applications much larger separation of the optical elements may be possible. This embodiment could also be changed to incorporate prisms or multiple detectors. Multiple detectors, as explained above, view both the reflected signal (as shown in FIG. 4) and the transmitted signal in order to increase the sensitivity of the optical strain gage. In all other respects this embodiment operates identically with the embodiments of FIGS. 1-3.

Figure 5:
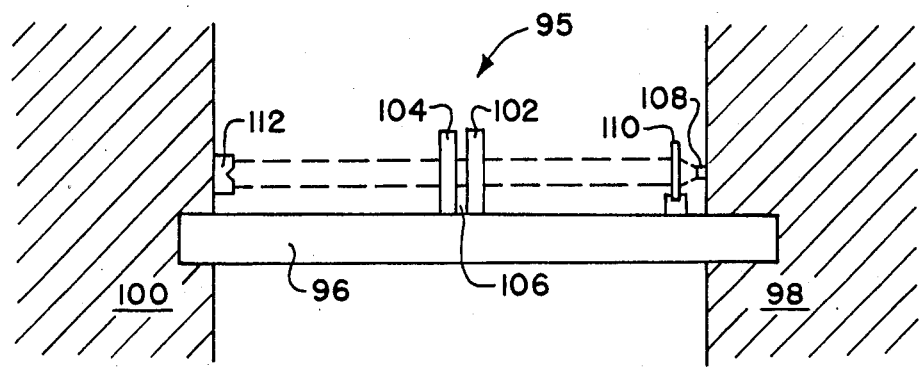
FIG. 5 is a schematic representation of a strain gage for measuring strain on a fixed beam.

FIG. 5 shows schematically an interferometric strain gage 95 associated with a beam fixed at both ends. The beam 96 has etalons 102, 104 positioned about its point of maximum deflection and is supported by supports 98 and 100. Two etalons 102 and 104 are supported on the beam 96. The etalons have non-reflective outer surfaces and partially reflective inner surfaces to form a reflective cavity 106. Light from a light source 108 is projected through a collimating lens 110 to the etalons 102 and 104. Multiple reflections in cavity 106 helps form an interferometric fringe field which is sensed by detector 112. Any deflection of beam 96 is sensed by detector 112 as a result of changes in the fringe field in cavity 106. Operation of this embodiment is therefore identical to those discussed with reference to FIGS. 1-4.

In order to produce the highest contrast and most useful fringe field in the above embodiments it is necessary to use monochromatic collimated light. This is preferably generated by laser devices. Several types of laser devices can be easily used with this invention. For example, light from a remote conventional HeNe laser can be directed into the sensor cavity by an optical fiber. Single mode optical fibers are preferred because multimode optical fibers generate many phase modes inside the fiber causing high contrast speckle in an expanded exit beam. The speckle pattern is very sensitive to bending motion at any point along the fiber length and as a result a fizeau interferometer fringe will appear as a broad low contrast modulation upon a high contrast speckle. This can be overcome by using diffuse light that emanates from the side of an unshielded portion of the multimode optical fiber. Single mode fibers, in comparison, provide a good point source for high contrast fringes at the fiber end.

Laser diodes can also be used as point light sources for the interferometer. There are a multitude of laser diodes currently available and these semiconductor lasers can be easily collimated for use with an interferometer force balance or strain gage. Further, semiconductor laser diodes are very small and are particularly useful in miniaturizing the interferometric strain gage for use in confined spaces.

Figure 6:
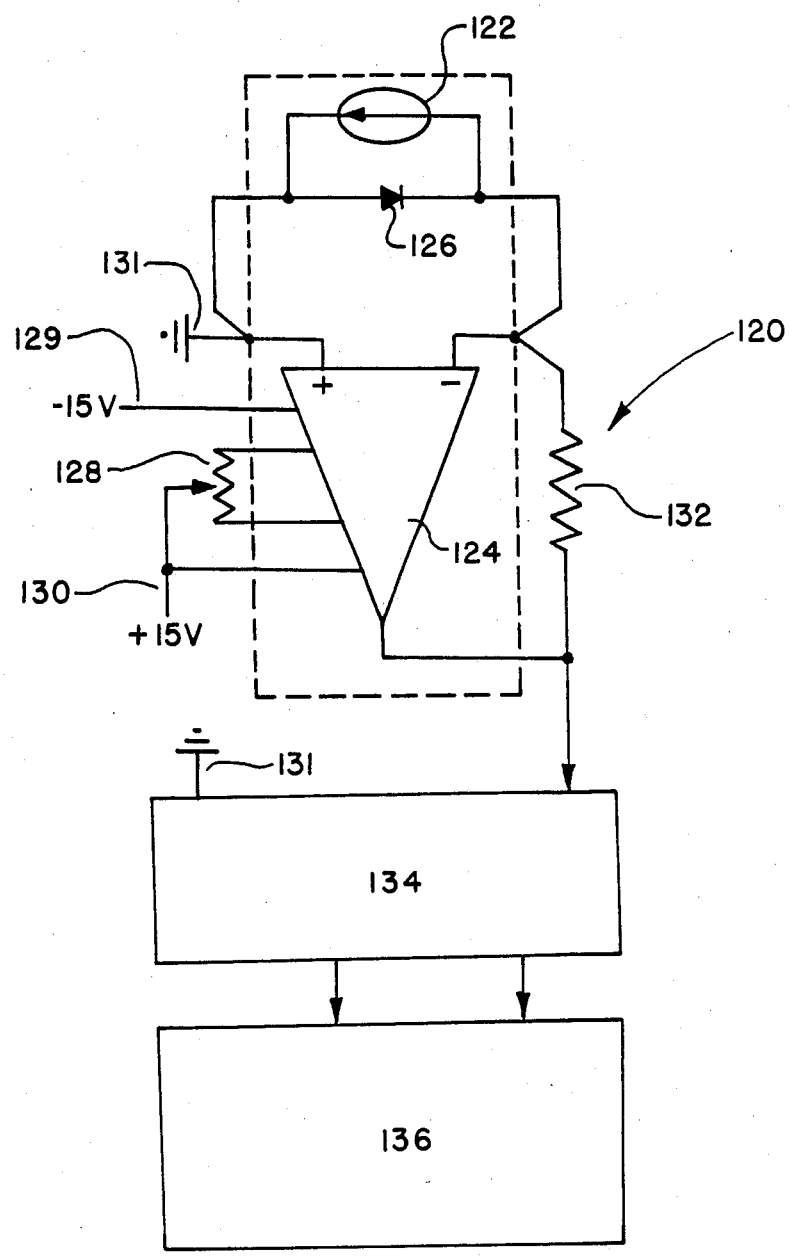
FIG. 6 is an electrical schematic of a detector circuit suitable for use with this invention.

Several detector circuits can be used to detect fringe shifts; a suitable circuit is diagramed in FIG. 6. The circuit of FIG. 6 is applicable to all the embodiments previously discussed.

The detector circuit 120 primarily comprises a light sensitive device 122 and an operational amplifier (op amp) 124. These components can be found on commercial semiconductor chips such as those produced by EG&G (Model No. HUV-1100BG). The light sensitive element which is used to detect fringe changes in the cavities is preferably one in which current varies with the variation in incoming light. Light sensor 122 is connected to both the op amp 124 and a diode 126 which prevents reverse current flow. The op amp 124 has an offset control 128 which varies voltage from a 15 volt voltage source 130. A minus 15 volt source 129 is also supplied. A small resistor 132 is used to provide feedback.

Output from the op amp is directed to a current amplifier 134 and then to a volt meter and recording device 136. The current amplification, volt meter and recording devices are similar to those used with conventional strain gages and compare the incoming signal to ground 131. Signal processing therefore is done in much the same manner as for conventional strain gage outputs.

In summary the advantages of the optic strain gage and load sensing devices described above include increased sensitivity and lower range. The optical devices are capable of detecting strain two decades lower than that which can be resolved with conventional wire strain gages. Further, the fringe position within the field can be shifted independently of the applied load. This provides an adjustment which is analogous to zeroing of an electronic device.

While the invention has been particularly described with reference to the preferred embodiments thereof, it will be understood by those skilled in the art that various changes in substance and form can be made therein without having departed from the spirit and the scope of the invention as detailed in the attached claims. For example, while this invention has been discussed in terms of conventional strain gage applications and force balances for wind tunnel experiments it could also be used to determine small shifts in the position of buildings and structures. Many buildings and structures are stiff and non-elastic, as a result very minute amounts of strain can be important in determining their structural integrity. Application of this invention to large structures could provide valuable warning that would prevent injury when they are subject to collapse due to settling or earthquakes.

I claim:
1. An interferometric sensor comprising:
   (a) a rigid support fixture secured to an underlying structure;
   (b) a load sensitive fixture connected to said rigid support fixture by a beam to flexing and secured to the underlying structure;
   (c) a first right angle prism affixed to said rigid support, said first prism having a partially reflective exterior surface, a totally reflective interior surface and a substantially non-reflective exterior surface;
   (d) a second right angle prism affixed to said load sensitive fixture, said second prism having a partially reflective exterior surface, a totally reflective interior surface and a non-reflective exterior surface wherein said partially reflective exterior surfaces of said first and second prisms are parallel and adjacent to each other such that the air gap wedge angle therebetween is less than 5 seconds;
   (e) a light source for projecting a collimated beam of light through said prisms; and
   (f) detector means for detecting changes in light intensity of light transmitted through said prisms as caused by angular movement of the prisms relative to each other which is a result of strain in the underlying structure, said movement resulting in a changed air gap wedge angle therebetween wherein said detector means is relatively insensitive to non-angular relative movement between said prisms and said light source so that the sensor is particularly sensitive to strain in the underlying structure.

* * * * *